United States Patent
You (10) Patent No.: US 10,438,063 B1
(45) Date of Patent: Oct. 8, 2019

(54) GENERATING GLOBAL CROP MAPS USING A STOCHASTIC ALLOCATION MODEL

(71) Applicant: Liangzhi You, Alexandria, VA (US)

(72) Inventor: Liangzhi You, Alexandria, VA (US)

(73) Assignee: Huazhong Agricultural University, Wuhan (CN)

( * ) Notice: Subject to any disclaimer, the term of this patent is extended or adjusted under 35 U.S.C. 154(b) by 88 days.

(21) Appl. No.: 15/494,531

(22) Filed: Apr. 23, 2017

(51) Int. Cl.
*G06K 9/00* (2006.01)
*G06F 17/50* (2006.01)
*A01G 22/00* (2018.01)

(52) U.S. Cl.
CPC ........ *G06K 9/00657* (2013.01); *A01G 22/00* (2018.02); *G06F 17/5009* (2013.01); *G06F 2217/16* (2013.01)

(58) Field of Classification Search
CPC .... G06K 9/00657; G06Q 50/02; A01G 22/00; G06F 17/5009; G06F 2217/16
See application file for complete search history.

(56) References Cited

U.S. PATENT DOCUMENTS

| | | | | |
|---|---|---|---|---|
| 7,047,135 B2 * | 5/2006 | Dyer | ................. | A01B 79/005 702/2 |
| 7,184,892 B1 * | 2/2007 | Dyer | ..................... | G06Q 10/00 702/2 |
| 7,725,233 B2 * | 5/2010 | Hendrickson | ........ | A01B 69/008 701/50 |
| 8,712,148 B2 * | 4/2014 | Paris | ....................... | G06T 11/00 345/589 |
| 8,855,937 B2 * | 10/2014 | Lindores | .............. | A01B 79/005 702/19 |
| 9,058,633 B2 * | 6/2015 | Lindores | ................ | G06Q 10/06 |
| 9,734,400 B2 * | 8/2017 | Shriver | ................ | G01N 33/025 |
| 9,881,214 B1 * | 1/2018 | Zhong | ................ | G06K 9/00657 |

(Continued)

OTHER PUBLICATIONS

You et al.; "Generating Global Crop Distribution Maps: From Census to Grid"; May 2014; Agricultural Systems; vol. 127, pp. 53-60 (Year: 2014).*

(Continued)

*Primary Examiner* — John Villecco
(74) *Attorney, Agent, or Firm* — Huazhong Agricultural University (57) ABSTRACT

The present invention is mathematical modelling to estimate crop area, yield and production for 42 major crops in the world across a global 5 arc minute grid. The model uses a downscaling approach that accounts for spatial variation in the biophysical conditions influencing the productivity of individual crops, and uses crop gross revenue potential of alternate crops when considering how to prioritize the allocation of specific crops to individual gridcells. The proposed methodology is an entropy-based optimization procedure that imposes a range of consistency and aggregation constraints. A particular feature of this method is the explicit inclusion of error terms. There is inherent uncertainty in many aspects of the model, such as input data, incomplete information on farmers' behavior, spatial heterogeneity of crop varieties and managements cross regions in the world. By explicitly including error terms, this method directly deal with such uncertainties, which leads to better and more reliable estimates.

6 Claims, 7 Drawing Sheets

(56) References Cited

U.S. PATENT DOCUMENTS

| | | | |
|---|---|---|---|
| 9,984,455 B1* | 5/2018 | Fox ................... | G06T 3/4038 |
| 10,115,158 B2* | 10/2018 | Lindores .............. | A01B 79/005 |
| 2014/0002489 A1* | 1/2014 | Sauder ................ | A01B 79/005 |
| | | | 345/629 |
| 2014/0067745 A1* | 3/2014 | Avey ................... | G06N 5/02 |
| | | | 706/46 |
| 2016/0217228 A1* | 7/2016 | Mewes ............... | G06F 17/5009 |
| 2016/0217231 A1* | 7/2016 | Mewes ............... | G06F 17/5009 |
| 2018/0267008 A1* | 9/2018 | Sutton ................. | G01N 33/246 |
| 2018/0330246 A1* | 11/2018 | Cohen ................. | G06N 5/04 |
| 2018/0365775 A1* | 12/2018 | You .................... | G06Q 50/02 |

OTHER PUBLICATIONS

You et al.; "Generating Plausible Crop Distribution Maps for Sub-Saharan Africa Using a Spatially Disaggregated Data Fusion and Optimization Approach"; Feb. 2009; Agricultural Systems; vol. 99, Issues 2-3; pp. 126-140 (Year: 2009).*

Hao et al.; "Spatial Optimization of Agricultural Land Use Based on Cross-Entropy Method"; Nov. 7, 2017; Entropy 2017, 19, 592 (Year: 2017).*

* cited by examiner

GENERATING GLOBAL CROP MAPS USING A STOCHASTIC ALLOCATION MODEL

BACKGROUND OF THE INVENTION

Agriculture is an intrinsically site-specific activity. Location determines the available physical assets, climatic patterns, and accessible input and output markets which ultimately influence the choice of production inputs and outputs. Data on agricultural production (i.e., harvested area, production quantity and yield) is usually representative of and reported at national and sub-national geo-political boundaries, but these statistics do not give any indication of the diversity and spatial patterns in agricultural production. It is increasingly common for agricultural and environmental studies to rely on the use of gridded crop production data generated by the downscaling of crop production statistics originally reported by more geographically-aggregated administrative units.

The drive for improved spatial resolution of the location (area) and performance (yield) of crop production is fueled by a number of mutually reinforcing factors. First and foremost, is growing awareness that a major obstacle to improving the effectiveness of policies and interventions aimed at improving rural well-being, agricultural growth, and natural resource sustainability is our inability to adequately account for the spatial heterogeneity of socio-economic, production, and environmental conditions. The more reliably we can assess the spatial distribution and covariance of such factors, the more cost-effective can be the formulation and targeting of appropriate policy and investment actions. Second, is the growing interest in understanding spatial patterns of agricultural production that might reveal untapped opportunities in, say, intensification and diversification, regional marketing, processing and trade or that might uncover significant levels of regional inequality and that, furthermore, might be helpful in shaping spatially-explicit strategic responses to such opportunities and challenges. Third, is simply the increasing ease and lower costs of exploring the spatial dimensions of agricultural development. Our capacity to acquire, manage, and share geo-referenced data has expanded significantly over the past twenty years, as have the range and utility of satellite and communications products and services—including the cropland and irrigated area land cover products utilized extensively in crop production down-scaling efforts such as those described here.

There have been some previous efforts to generate global crop maps. Leff, Ramankutty and Foley (2004) synthesized satellite-derived land cover data and agricultural census data to produce global data sets of the distribution of 18 major crops across the world. They first collected agricultural census data on harvested area for crops at (mostly) national or sub-national level. From these data, for each administrative unit, they estimated the proportion of each of the 18 major crops to the total harvested area. After masking non-cropland areas and applying a smoothing algorithm to correct abrupt and arbitrary changes across administrative boundaries, Leff, Ramankutty and Foley (2004) multiplied the resulting data of individual crop proportions by the cropland data sets to obtain the per-pixel proportion of each of the 18 major crops. Monfreda, Ramankutty and Foley (2008) used pixel-level cropland area shares as uniform weights for all crops and produced the year 2000 area (harvested) and yield distribution of 175 distinct crops of the world. By combining Ramankutty et al. (2008), Monfreda, Ramankutty and Foley (2008) and the global map of irrigation areas (GMIA). Portmann et al (2010) produced a global dataset of monthly growing areas of 26 irrigated crops on the same 5×5 arc minutes grid. You et al (2014) produced global crop maps through a downscaling approach that accounts for spatial variation in the biophysical conditions influencing the productivity of individual crops within the cropland extent, and that uses crop prices to weigh the gross revenue potential of alternate crops when considering how to prioritize the allocation of specific crops to individual gridcells. While all the previous modelling work has admitted the huge uncertainty of downscaling the crop production, none of them have explicitly included uncertainty/error term in their approaches. Therefore what is needed is the new, improved method to explicitly include error term to tackle the inherent uncertainty in the downscaling modelling.

SUMMARY OF THE INVENTION

The present invention teaches a method to produce crop area, yield and production for 42 major crops in the world across a global 5 arc minute grid. It further disaggregates the crop area, production and yield under four rainfed and irrigated production systems at the same global 5 arc minute grid. The invention also teaches a program storage device readable by a machine that may store a machine readable code to produce global crop maps. Further a corresponding system is disclosed to perform the method.

The method encompasses notions of comparative advantage and potential economic worth as factors influencing the geographic distribution of crop production. This is done through a downscaling approach that accounts for spatial variation in the biophysical conditions influencing the productivity of individual crops within the cropland extent, and that uses crop prices to weigh the gross revenue potential of alternate crops when considering how to prioritize the allocation of specific crops to individual gridcells. The proposed methodology also allows for the inclusion of partial, existing sources of evidence on local crop distribution patterns through the use of spatial allocation priors that are then subjected to an entropy-based optimization procedure that imposes a range of consistency and aggregation constraints.

A particular feature of this method is the explicit inclusion of error terms. There is inherent uncertainty in many aspects of this method, such as input data, downscaling methodology, incomplete information on farmers' behavior, huge spatial heterogeneity as well as significant variability of crop varieties cross regions in the world. By explicitly including error terms, this method directly deal with such uncertainties, which leads to better and more reliable estimates.

Additional objects, advantages and novel features of the invention will be set forth in part in the following description, and in part will become apparent to those skilled in the art upon examination of what will be followed or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings illustrate embodiments of the current invention, and together with the description, serve to explain the principle of the invention.

DETAILED DESCRIPTION OF THE INVENTION

The present invention discloses method, computer-readable storage medium and system for estimating crop area, yield and production at a finer, pixel level. Historical data on crop statistics at country or sub-country levels, crop prices, crop biophysical suitability, population density, satellite imagery of cropland extent, irrigation distribution etc. may be used in an optimization process to estimate the crop distribution. A cross-entropy optimization explicitly includes error terms to tackle the inherent uncertainty in the input datasets as well as the estimation process. This is a unique feature which has not been done in our previous published papers.

Figure 1:
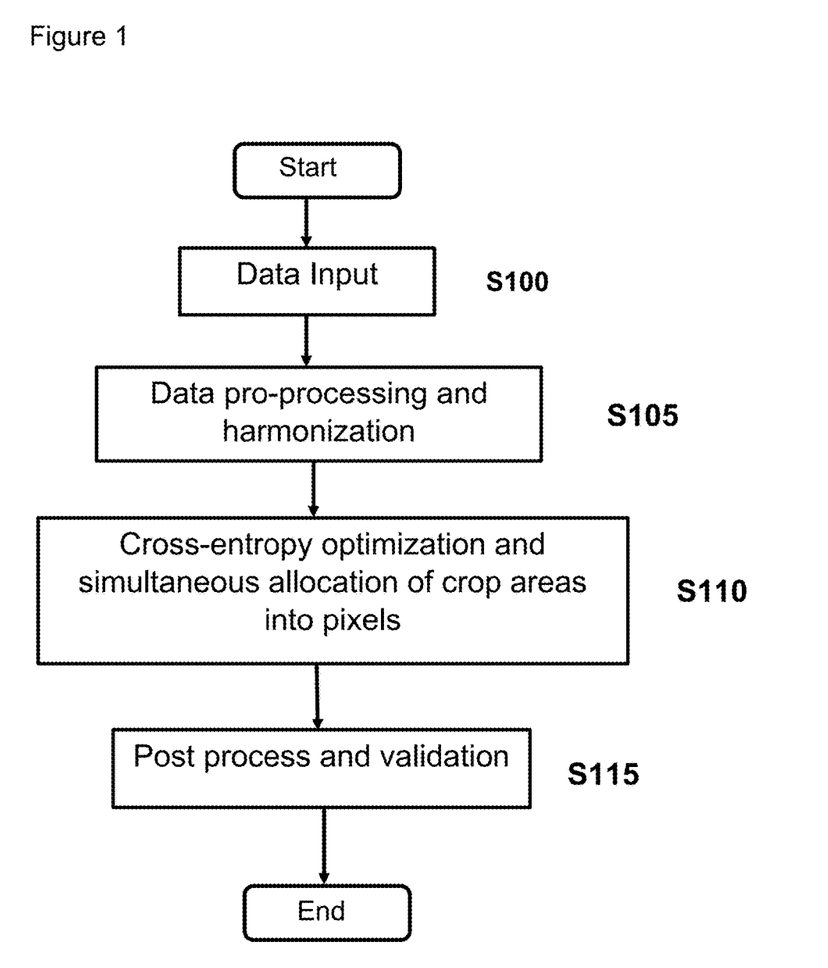
FIG. 1 is a flow chart illustrating an exemplary method for estimating global crop production distribution.
Figure 2:
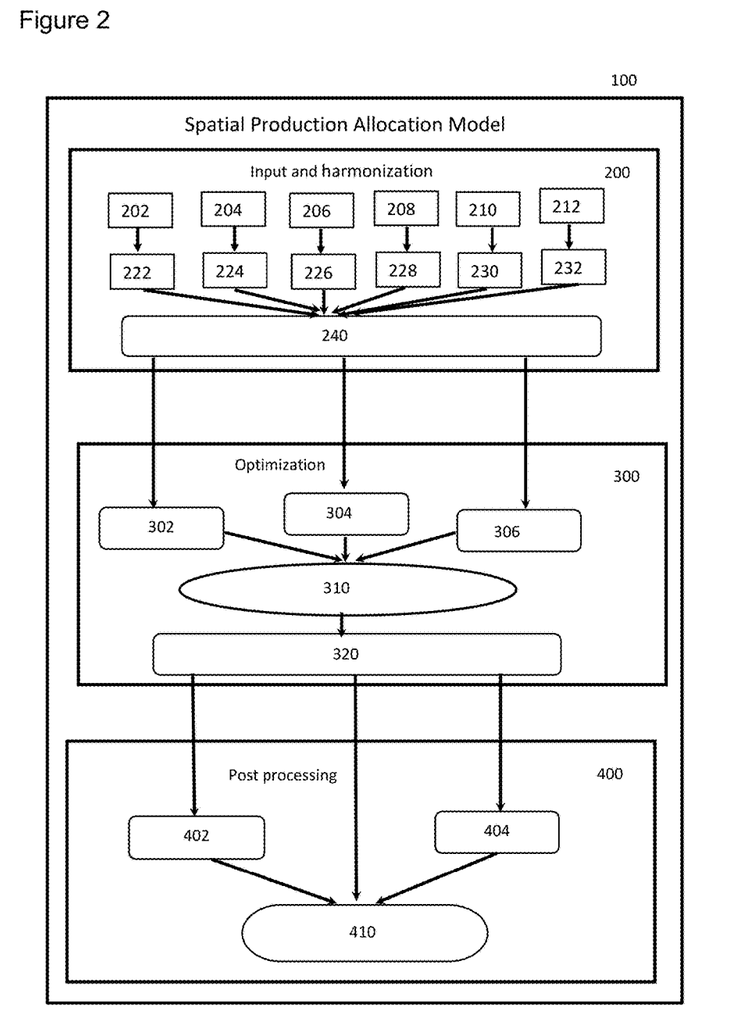
FIG. 2 shows a functional block diagram of a system for estimating global crop production distribution.
Figure 3:
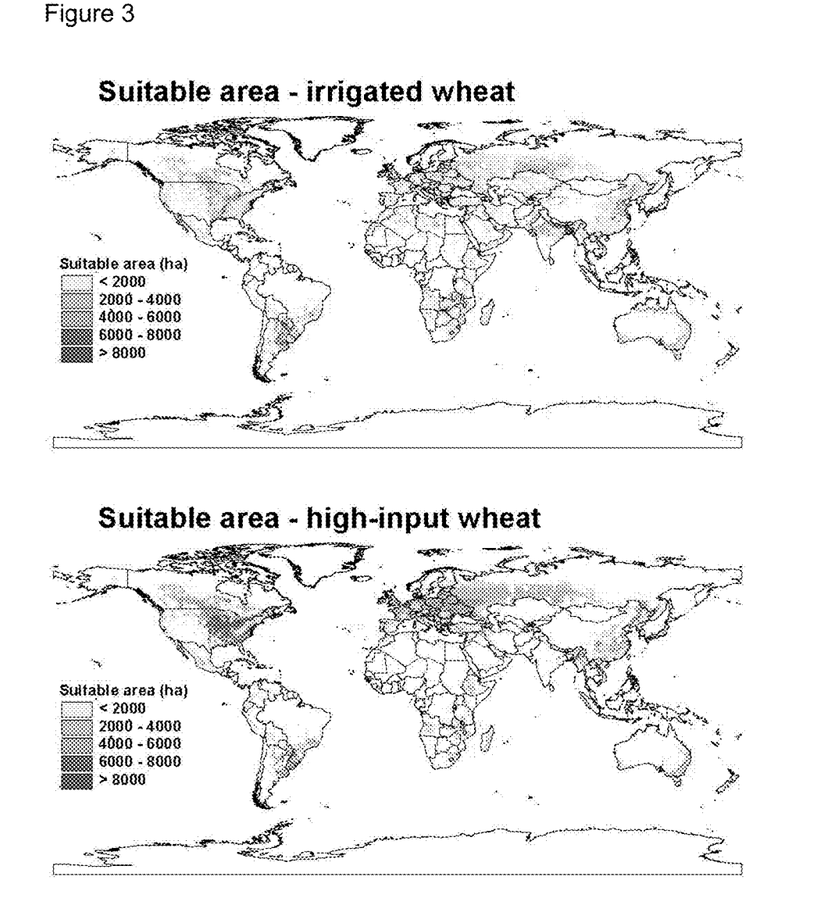
FIG. 3 shows crop suitability surfaces—suitable areas for irrigated wheat and high-input rainfed wheat.
Figure 4:
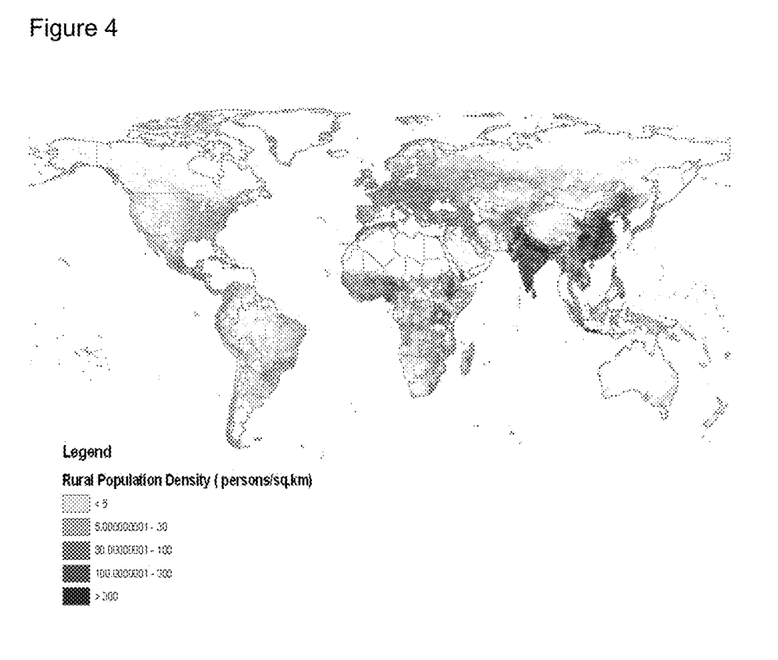
FIG. 4 shows rural population density of the world.

Referring to FIG. 1 and FIG. 2, an overview of the present invention will now be described. FIG. 1 shows an embodiment of a method as per the current invention. It starts with a data input step (S100), and then the inputted datasets are cleaned, processed and harmonized to be consistent with each other (S105). The harmonized datasets are used to calculate prior estimations (initial best guess of crop distribution), to generate inputs and constraints into an optimization process (S110), and the outputs of the optimization are the results: the crop area, yield at pixel level. These results are through a validation process (S115) before they are finally released. FIG. 2 represents one embodiment of a program storage device and analysis device readable by a machine 100 or crop area and yield estimation device 100 as per an aspect of the current invention. The input and harmonization unit (200) receives various input data and the program (model) analyzes the input data and finds and handles the inconsistency among the inputs. These data includes, but not limited to, national and sub-national crop statistics (202), crop production system information (204), satellite image of cropland (206), irrigation surface (208), crop biophysical suitability (210), the linkage table of administrative regions (e.g. state or county) and the pixel identifiers (212). FIG. 3 shows a specific example of crop biophysical suitability of wheat. The two maps show the suitable areas under irrigated and rainfed conditions respectively. FIG. 4 shows rural population density which affects crop prices.

The initial harmonization process follows a few basic constraints such as:

i. That the total land in crops must be greater than or equal to the sum of irrigation area;
ii. That statistical physical areas summed over all crops and production systems must be less than or equal to the sum of cropland;
iii. That irrigated statistical physical areas summed over all crops must be less than or equal to the sum of areas equipped for irrigation; and
iv. That statistical physical area must be less than or equal to the suitable area per crop and production system.

In many cases these conditions are not met due to the different sources of the data, inaccuracies, different times of measurement, different scales, inconsistencies in classification, and various other reasons. Therefore adjustments were made following a hierarchy of 'credibility' that are defined in decreasing order of importance:

i. Statistical data;
ii. Cropland;
iii. Area equipped for irrigation;
iv. Suitable area.

Statistical data was not changed, except in the unusual case when a model run failed to yield a solution, and only after all other modification options were exhausted. The general approach to the pixel-level area adjustments was to upscale each variable so that they matched the statistical totals reported for the smallest available administrative unit, checking back that the corresponding totals at higher administrative units also continued to align. The new input datasets would be into new files shown in FIG. 2 which is identified by 222, 224, 226 etc. All these input data is merged into a linked database 240.

The harmonized input data is used to calculate three critical inputs for an optimization model. These 3 critical inputs are the prior allocation of crop areas (302), the equations (304), and the constraints (306). The optimization model (More in the following) is written a GAMS coding language (310). The output from this optimization is crop area estimates in each pixel (320). Then using the estimated areas in each pixel and input information (202, 204), the crop yield and production for that pixel are calculated (Equations (45), (46), (47) below).

Figure 5:
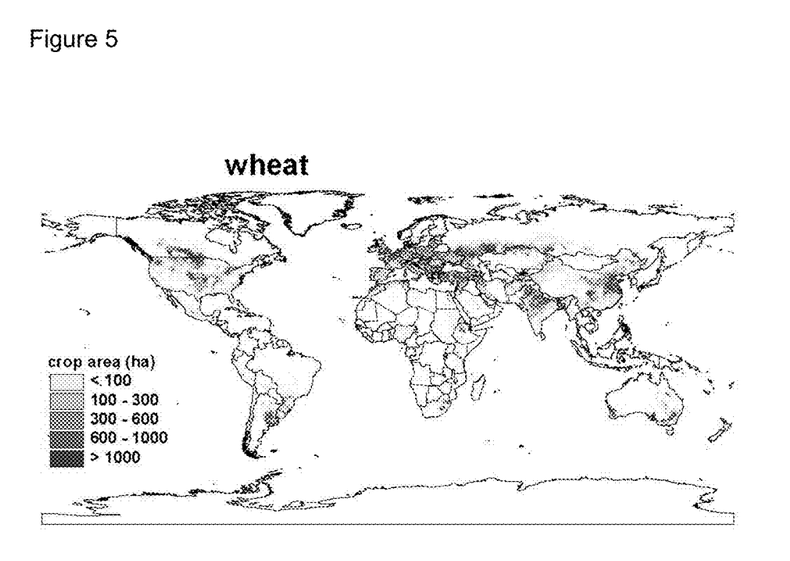
FIG. 5 shows result of global crop distribution of wheat area with a 5 arc minute resolution.
Figure 6:
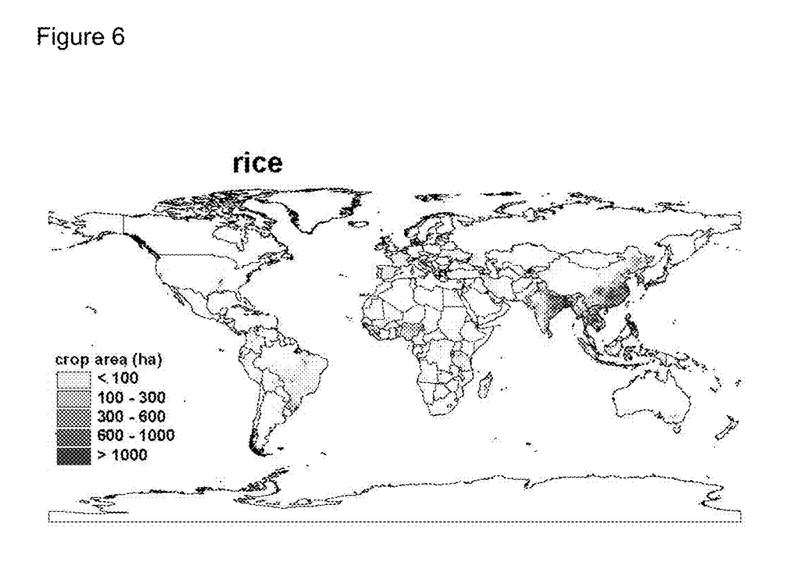
FIG. 6 shows result of global crop distribution of rice area with a 5 arc minute resolution.

The final results of the current invention are the global maps (theoretically at any resolution but here at 5-minute resolution) of crop area, yield and production for the 40+ main crops listed below. FIG. 5 and FIG. 6 show two examples of these results. FIG. 5 is crop distribution map of wheat at a five minute resolution while FIG. 6 shows the distribution of rice of the world. This invention produces similar maps (distributions) for all the 40+ crops listed below and maps of crop yield and production for all the crops too. This invention is a huge improvement over our previous deterministic model where error terms are not explicitly included. In addition, the new model makes the implementation of the model more smoothly as it now tolerates the unavoidable data inconsistency and noise in the input information. The 42 main crops are: Wheat, Rice, Maize, Barley, Pearl Millet, Small Millet, Sorghum, Other Cereals, Potato, Sweet Potato, Yams, Cassava, Other Roots, Bean, Chickpea, Cowpea, Pigeon Pea, Lentil, Other Pulses, Soybean, Groundnut, Coconut, Oilpalm, Sunflower, Rapeseed, Sesame Seed, Other Oil Crops, Sugarcane, Sugarbeet, Cotton, Other Fibre Crops, Arabica Coffee, Robusta Coffee, Cocoa, Tea, Tobacco, Banana, Plantain, Tropical Fruit, Temperate Fruit, Vegetables, Rest Of Crops.

The optimization model (300) is the most important part of the current invention. Following our earlier work (You et al., 2014), we define our spatial crop allocation problem in a cross entropy framework but we added an error term in the sub-national statistics equation. Let $s_{ijl}$ be the area share allocated to pixel i and crop j at input level l within a statistical reporting unit (SRU, say X). A SRU is normally a geopolitical unit such as country, state/province. $A_{ijl}$ is the area allocated to pixel i for crop j at input level l in X. Therefore:

$$s_{ijl} = \frac{A_{ijl}}{CropArea_{jl}} \quad (23)$$

Let $\pi_{ijl}$ be the prior area shares we know by our best guess for pixel i and crop j at input level l. The modified spatial allocation model can be written as follows:

$$\underset{\{s_{ijl}, w_{jkn}\}}{\text{MIN}} CE(s_{ijl}, w_{jkn}) = \sum_i \sum_j \sum_l s_{ijl} \ln s_{ijl} - \sum_i \sum_j \sum_l s_{ijl} \ln \pi_{ijl} + \sum_k \sum_j \sum_n w_{jkn} \ln w_{jkn} - \sum_k \sum_j \sum_n w_{jkn} \ln \overline{w}_{jkn} \quad (24)$$

$$\sum_i s_{ijl} = 1 \; \forall j \forall l \quad (25)$$

$$\sum_j \sum_l CropArea_{jl} \times s_{ijl} \leq \text{Avail}_i \; \forall i \quad (26)$$

subject to:

$$CropArea_{jl} \times s_{ijl} \leq SuitArea_{ijl} \; \forall i \forall j \forall l \quad (27)$$

$$\sum_{i \in k} \sum_l CropArea_{jl} \times s_{ijl} = (1 + e_{jk}) SubCropArea_{jk} \; \forall k \forall j \in J \quad (28)$$

$$\sum_{l \in L} CropArea_{jl} \times s_{ijl} \leq IRRArea_i \; \forall i \quad (29)$$

$$e_{jk} = \sum_n w_{jkn} \times \overline{v}_n \; \forall k \forall j \in J \quad (30)$$

$$\sum_n w_{jkn} = 1 \; \forall k \forall j \in J \quad (31)$$

$$1 \geq w_{jkn} \geq 0 \; \forall n \forall k \forall j \in J \quad (32)$$

$$1 \geq s_{ijl} \geq 0 \; \forall i, j, l \quad (33)$$

where:
i: i=1, 2, 3, ..., pixel identifier within the allocation unit, and
j: j=1, 2, 3, ..., crop identifier (such as maize, cassava, rice) within the allocation unit, and
l: l=irrigated, rainfed-high input, rainfed-low input, subsistence, management and input levels for crops
k: k=1, 2, 3, ..., identifiers for sub-national geopolitical units
n: n=1, 2, 3, ..., identifier for error elements of error distribution.
J: a set of those commodities which sub-national production statistics exist
L: a set of those commodities which are partly irrigated within pixel i.
$\text{Avail}_i$: total agricultural land in pixel i, which is equal to total agricultural area estimated from land cover satellite image as described in the previous section.
$\text{SuitArea}_{ijl}$: the suitable area for crop j at input level l in pixel i, which comes from FAO/IIASA suitability surfaces as described in the previous section.
$\text{IRRArea}_i$: the irrigation area in pixel i from global map of irrigation.

Comparing to our previous models, the major improvement here is adding an error term in Equation (28). The objective function of the spatial allocation model is the sum of the cross entropy of area shares and their prior, and that of error weights and the corresponding prior. Equation (25) is adding-up constraints for crop-specific areas. Equation (26) is land cover image constraint that the actual agricultural area in pixel i from satellite image is the upper limit for the area to be allocated to all crops. Equation (27) is the constraint that the allocated crop area cannot exceed what are suitable for the particular crop. Constraint (28) sets the sum of all allocated areas within those subnational units with existing statistical data to be equal to the corresponding subnational statistics with an error $e_{jk}$. Constraint (29) includes the irrigation information: the sum of all allocated irrigated areas in any pixel must not exceed the area equipped for irrigation indicated in global map of irrigation (Siebert et al., 2005). Equations (30) and (31) define the error term (more on that in the following section). The last two equations, (32) and (33), are basically the natural constraints of $s_{ijl}$ and $w_{jkn}$ as probabilities. As we can see, the essence of this classic CE approach is to use any and all sources of information to best guess where crops might actually grow.

Equation (30) takes account of the measurement noise associated with subnational statistics. We define the error as a weighted average of a support set $\overline{v}_n$, as shown in Equation (30). In the current model, we used a three-weighted error distribution (n=3). We assume a symmetric error distribution with a zero mean, the $\overline{v}_n$'s set the upper and lower bounds of the error. In the current allocation, we set them as 15% of the reported statistics. That is:

$$\overline{v}_1 = -3*5\% = -15\%$$

$$\overline{v}_2 = 0$$

$$\overline{v}_3 = +3*5\% = 15\% \quad (34)$$

The prior weights and support set are symmetric. The prior weights could be estimated as (Robinson and El-Said, 2000):

$$\overline{w}_{jk1} = \overline{w}_{jk3} = \frac{1}{18} \quad (35)$$

$$\overline{w}_{jk2} = 1 - \overline{w}_{jk1} - \overline{w}_{jk3} = \frac{16}{18}$$

After the optimization (300), we enter the post-processing module (400). From the pixel level crop area from 300, we could calculate the crop production (402) and yield (404) at the same pixel. To convert the allocated crop areas into production, we need consider both the broader production systems and the spatial variation within the systems. We first calculate an average potential yield within a SRU, $\overline{Y}_{jl}$, for crop j in production system l using the allocated areas ($A_{ijl}$) as weight:

$$\overline{Y}_{jl} = \frac{\sum_i PotYield_{ijl} \times A_{ijl}}{\sum_i A_{ijl}} \quad (45)$$

Then estimate the actual crop yield of crop j in production system l and pixel i ($Y_{ijl}$) as $$\overline{Y}_{ijl} = \frac{PotYield_{ijl} \times Yield_{jl}}{\overline{Y}_{jl}} \quad (46)$$

where $Yield_{jl}$ is the statistical yield (from census data) for crop j in production system l. The production of crop j in production system l, and pixel i, $Prod_{ijl}$, could be calculated as the following:

$$Prod_{ijl} = (A_{ijl} \times CropIntensity_{jl}) \times Y_{ijl} \quad (47)$$

These calculated area, production and yield are stored in a final database 410.

The inventive subject matter described herein may be implemented as a method or process performed by a data processing system and/or an electronic circuit such as an integrated circuit (IC) within a data processing system. The IC, for example, may be a processor. In another aspect, the inventive subject matter may be implemented as a system, e.g., an apparatus, such as an electronic circuit. The electronic circuit may be implemented as an IC that may be implemented as, or include, a processor. Examples of processors may include, but are not limited to, central processing units (CPUs), graphics processing units (GPUs), controllers, digital signal processors (DSPs), or the like. Further, the processor may be part of a larger system such as a programmable IC, a data processing system or other computing and/or communication device.

Figure 7:
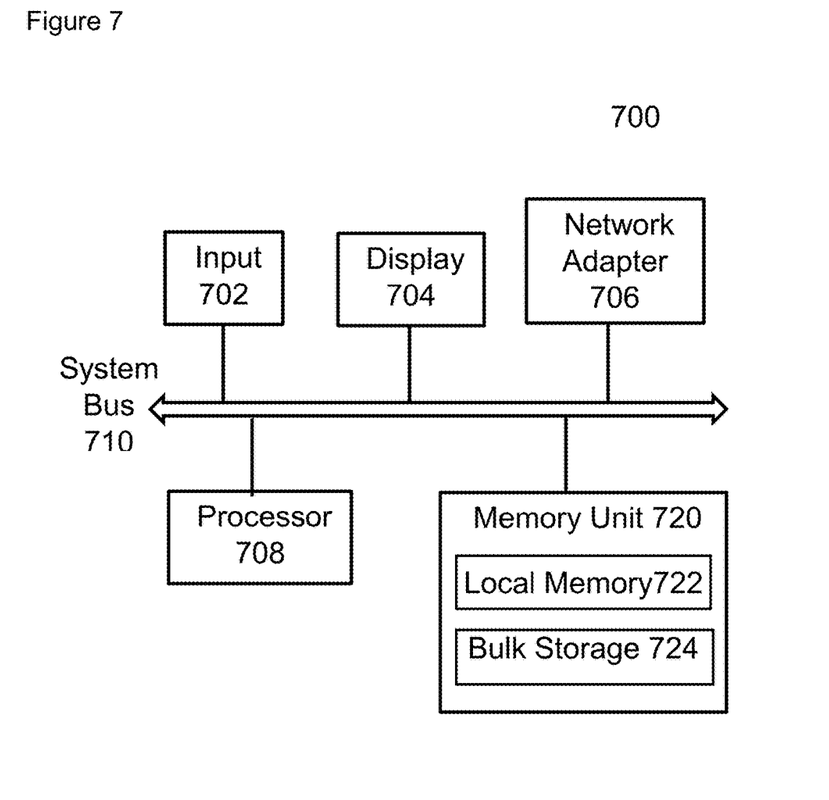
FIG. 7 is an exemplary architecture of a data processing system for estimating global crop production distribution.

FIG. 7 is a block diagram illustrating an exemplary architecture 700 of a data processing system for performing the method. System 700 includes at least one processor 708. Examples of processor 708 may include, but are not limited to, a CPU, a DSP, a GPU, a field programmable gate array or other programmable IC, or the like. Processor 708 may be coupled to memory unit 720 through a system bus 710 or other suitable circuitry. System 700 may store program code within memory unit 720. Processor 708 executes the program code accessed from memory unit 720 via system bus 710. Memory unit 720 includes one or more physical memory devices such as, for example, a local memory 722 and one or more bulk storage devices 724. Local memory 722 refers to random access memory (RAM) or other non-persistent memory device(s) generally used during actual execution of the program code. Bulk storage device 724 may be implemented as a hard disk drive (HDD), a solid state drive (SSD), or other non-transitory data storage device.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method for generating global crop distribution, the method comprising:

in a computer system, configuring a processor for performing:

inputting datasets collected from different sources;

preprocessing the input datasets and harmonizing the inconsistency among the input datasets;

calculating prior estimates and constraints for a stochastic optimization model;

simultaneously allocating crop areas into pixels using the stochastic optimization model including error terms, wherein the error terms comprise weighted average of a support set which sets the upper and lower bounds of the error terms;

explicitly applying the error terms in sub-national area constraints;

including the error terms as a penalty in an objective function of the stochastic optimization model and as parameters to be optimized; and generating spatial distribution of area, yield and production of major crops in the world wherein the inclusion of the error terms accounts for uncertainties in the input datasets.

2. The method of claim 1, wherein a symmetric error distribution with a zero mean is assumed for the error terms, and the lower bound and upper bound for the error terms are set to −15% and +15% respectively.

3. The method of claim 1, wherein the input datasets include at least one of: national and sub-national crop statistics, crop production system information, satellite image of cropland, irrigation map, crop biophysical suitability, rural population density and crop prices.

4. The method of claim 1, wherein a cross entropy approach is used in the stochastic optimization model for crop production allocation, and wherein the cross entropy approach is applied at a country level or at the whole world.

5. The method of claim 1, wherein the generating step generates spatial distribution of area, yield and production for major crops in the world including at least one of: wheat, rice, maize, barley, pearl millet, small millet, sorghum, potato, sweet potato, yams, cassava, bean, chickpea, cowpea, pigeon pea, lentil, soybean, groundnut, coconut, oilpalm, sunflower, rapeseed, sesame seed, sugarcane, sugarbeet, cotton, arabica coffee, robusta coffee, cocoa, tea, tobacco, banana, plantain, and vegetables.

6. A non-transitory computer-readable storage device, embodying program code comprising instructions executable by a computer system to perform a method for generating global crop distribution, the method comprising:

in the computer system, configuring a processor for performing:

inputting datasets collected from different sources;

preprocessing the input datasets and harmonizing the inconsistency among the input datasets;

calculating prior estimates and constraints for a stochastic optimization model;

simultaneously allocating crop areas into pixels using the stochastic optimization model including error terms, wherein the error terms comprise weighted average of a support set which sets the upper and lower bounds of the error terms;

explicitly applying the error terms in sub-national area constraints;

including the error terms as a penalty in an objective function of the stochastic optimization model and as parameters to be optimized; and generating spatial distribution of area, yield and production of major crops in the world wherein the inclusion of the error terms accounts for uncertainties in the input datasets.

\* \* \* \* \*